US010823069B2

United States Patent
DiBenedetto et al.

(10) Patent No.: US 10,823,069 B2
(45) Date of Patent: Nov. 3, 2020

(54) INTERNAL HEAT EXCHANGER SYSTEM TO COOL GAS TURBINE ENGINE COMPONENTS

(71) Applicant: United Technologies Corporation, Farmington, CT (US)

(72) Inventors: Enzo DiBenedetto, Berlin, CT (US); Matthew E. Bintz, West Hartford, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 71 days.

(21) Appl. No.: 16/185,565

(22) Filed: Nov. 9, 2018

(65) Prior Publication Data

US 2020/0149474 A1    May 14, 2020

(51) Int. Cl.
| | |
|---|---|
| *F04D 29/54* | (2006.01) |
| *F02C 7/18* | (2006.01) |
| *F01D 25/12* | (2006.01) |
| *F02C 7/141* | (2006.01) |
| *F02K 3/06* | (2006.01) |

(52) U.S. Cl.
CPC ............... *F02C 7/18* (2013.01); *F01D 25/12* (2013.01); *F02C 7/141* (2013.01); *F02K 3/06* (2013.01); *F05D 2220/323* (2013.01); *F05D 2260/213* (2013.01); *F05D 2260/232* (2013.01)

(58) Field of Classification Search
CPC ............... F04D 27/0207; F04D 27/023; F04D 27/0215; F04D 29/009; F05D 2260/606; F01D 25/12
See application file for complete search history.

(56) References Cited

U.S. PATENT DOCUMENTS

| | | | | |
|---|---|---|---|---|
| 3,632,223 A | * | 1/1972 | Hampton | F04D 29/522 415/144 |
| 5,059,093 A | * | 10/1991 | Khalid | F01D 17/105 415/115 |
| 6,325,595 B1 | * | 12/2001 | Breeze-Stringfellow | F01D 17/10 415/144 |

(Continued)

FOREIGN PATENT DOCUMENTS

| | | |
|---|---|---|
| EP | 3187692 A1 | 7/2017 |
| EP | 3216987 A1 | 9/2017 |

OTHER PUBLICATIONS

The Extended European Search Report for Application No. 19207451. 6-1007; Report dated Mar. 18, 2020; Report Received Date: Apr. 3, 2020; 8 pages.

*Primary Examiner* — Ninh H. Nguyen
(74) *Attorney, Agent, or Firm* — Cantor Colburn LLP

(57) ABSTRACT

A high pressure compressor section of a gas turbine engine including: an inner case separating a core flow path of the gas turbine engine and a plenum formed between the inner case and an outer case; a bleed port located on an inner surface of the inner case, the inner surface being proximate the core flow path; an outlet located on an outer surface of the inner case, the outer surface being proximate the plenum; and a bleed air passageway passing through the inner case to fluidly connect the bleed port to the outlet, wherein the bleed air passageway is fluidly connected to the core flow path through the bleed port and the bleed air passageway is fluidly connected to the plenum through the outlet.

19 Claims, 3 Drawing Sheets

(56) References Cited

U.S. PATENT DOCUMENTS

| | | | |
|---|---|---|---|
| 7,249,929 B2 * | 7/2007 | Cummings | F01D 17/105 29/889.22 |
| 8,459,040 B2 | 6/2013 | Glahn et al. | |
| 9,850,819 B2 | 12/2017 | Suciu et al. | |
| 10,072,577 B2 | 9/2018 | Marini et al. | |
| 2007/0234738 A1 | 10/2007 | Borcea | |
| 2011/0014028 A1 | 1/2011 | Wood et al. | |
| 2014/0126991 A1 | 5/2014 | Ekanayake et al. | |
| 2017/0167388 A1 | 6/2017 | Merry et al. | |
| 2018/0051628 A1 | 2/2018 | Roberge | |
| 2018/0156122 A1 | 6/2018 | Schwarz et al. | |
| 2018/0313364 A1 | 11/2018 | Moeckel et al. | |

* cited by examiner

INTERNAL HEAT EXCHANGER SYSTEM TO COOL GAS TURBINE ENGINE COMPONENTS

BACKGROUND

The subject matter disclosed herein generally relates to gas turbine engines and, more particularly, to a method and apparatus for removing heat from a high pressure compressor section.

Gas turbine engines operate by passing a volume of high energy gases through a plurality of stages of vanes and blades, each having an airfoil, in order to drive turbines to produce rotational shaft power. The shaft power is used to drive a compressor to provide compressed air to a combustion process to generate the high energy gases. Additionally, the shaft power may be used to drive a generator for producing electricity, or to drive a fan for producing high momentum gases for producing thrust. In order to produce gases having sufficient energy to drive the compressor, generator and fan, it is necessary to combust the fuel at elevated temperatures and to compress the air to elevated pressures, which also increases its temperature. A high pressure compression section of a gas turbine engine often increases in temperature during operation of the gas turbine engine. Accordingly, it is desirable to remove heat from the high pressure compression section.

SUMMARY

According to an embodiment, a high pressure compressor section of a gas turbine engine is provided. The high pressure compressor section including: an inner case separating a core flow path of the gas turbine engine and a plenum formed between the inner case and an outer case; a bleed port located on an inner surface of the inner case, the inner surface being proximate the core flow path; an outlet located on an outer surface of the inner case, the outer surface being proximate the plenum; and a bleed air passageway passing through the inner case to fluidly connect the bleed port to the outlet, wherein the bleed air passageway is fluidly connected to the core flow path through the bleed port and the bleed air passageway is fluidly connected to the plenum through the outlet.

In addition to one or more of the features described above, or as an alternative, further embodiments may include that the bleed air passageway passes radially outward of a first vane and a second vane.

In addition to one or more of the features described above, or as an alternative, further embodiments may include that the outlet is located radially outward of the second vane.

In addition to one or more of the features described above, or as an alternative, further embodiments may include that an outer diameter end of the first vane is located within a first vane slot within the inner case, the first vane being secured to the first vane slot through the outer diameter end of the first vane, wherein the bleed air passageway further includes the first vane slot.

In addition to one or more of the features described above, or as an alternative, further embodiments may include that an outer diameter end of the second vane is located within a second vane slot within the inner case, the second vane being secured to the second vane slot through the outer diameter end of the second vane, wherein the bleed air passageway further includes the second vane slot.

In addition to one or more of the features described above, or as an alternative, further embodiments may include: a seal wrapped around the outer diameter end of the first vane within the first vane slot, the seal being configured to fluidly separate the bleed air passageway from the core flow path within the first vane slot.

In addition to one or more of the features described above, or as an alternative, further embodiments may include: a first mounting flange including a first interrupted snap; a second mounting flange secures to the inner case, the inner case including a second interrupted snap, wherein the bleed air passage passes through the first interrupted snap and the second interrupted snap.

In addition to one or more of the features described above, or as an alternative, further embodiments may include: a first fluid passageway within the inner case, the first fluid passageway fluidly connecting the bleed port to the first interrupted snap.

In addition to one or more of the features described above, or as an alternative, further embodiments may include: a first vane slot configured to receive an outer diameter end of a first vane, wherein the first vane slot is fluidly connected to the first fluid passageway through the first interrupted snap In addition to one or more of the features described above, or as an alternative, further embodiments may include: a second fluid passageway within the inner case, the second fluid passageway being fluidly connected to the second vane slot through the second interrupted snap.

In addition to one or more of the features described above, or as an alternative, further embodiments may include that the second fluid passageway is fluidly connected to the outlet.

In addition to one or more of the features described above, or as an alternative, further embodiments may include: a second vane slot configured to receive an outer diameter end of a second vane, wherein the second fluid passageway is fluidly connected to the outlet through the second vane slot.

In addition to one or more of the features described above, or as an alternative, further embodiments may include that the second vane slot is fluidly connected to the outlet through a third fluid passage within the inner case.

In addition to one or more of the features described above, or as an alternative, further embodiments may include that the bleed air passageway further includes: a second vane slot configured to receive an outer diameter end of a second vane.

In addition to one or more of the features described above, or as an alternative, further embodiments may include that the bleed air passageway further includes: a first fluid passageway within the inner case, the first fluid passageway being fluidly connected to the bleed port; a first vane slot configured to receive an outer diameter end of a first vane, the first vane slot being fluidly connected to the first fluid passageway; a second fluid passageway within the inner case, the second fluid passageway fluidly connected the first vane slot; a second vane slot configured to receive an outer diameter end of a second vane, the second vane slot being fluidly connected to the second fluid passageway; and a third fluid passageway within the inner case, the third fluid passageway fluidly connecting the second vane slot to the outlet.

In addition to one or more of the features described above, or as an alternative, further embodiments may include: a first mounting flange including a first interrupted snap; a second mounting flange secures to the inner case, the inner case including a second interrupted snap, wherein the first vane slot is fluidly connected to the first fluid passageway through the first interrupted snap, and wherein the second vane slot is fluidly connected to the second fluid passageway through the second interrupted snap.

In addition to one or more of the features described above, or as an alternative, further embodiments may include that the second vane is an exit guide vane for directing compressed inlet air from the core flow path into a combustor of the gas turbine engine.

In addition to one or more of the features described above, or as an alternative, further embodiments may include: a heat shield interposed between the first mounting flange and the bleed air passageway.

According to another embodiment, a method of cooling a high pressure compressor section of a gas turbine engine is provided. The method comprising: siphoning compressed inlet air from a high pressure compressor section of a gas turbine engine; directing siphoned compressed inlet air through a bleed air passageway passing through an inner case of the high pressure compressor section, the inner case separating a core flow path of the gas turbine engine and a plenum formed between the inner case and an outer case; and expelling the siphoned compressed inlet air into the plenum.

According to another embodiment, a gas turbine engine is provided. The gas turbine engine comprises: a high pressure compressor section comprising: an inner case separating a core flow path of the gas turbine engine and a plenum formed between the inner case and an outer case; a bleed port located on an inner surface of the inner case, the inner surface being proximate the core flow path; an outlet located on an outer surface of the inner case, the outer surface being proximate the plenum; and a bleed air passageway passing through the inner case to fluidly connect the bleed port to the outlet, wherein the bleed air passageway is fluidly connected to the core flow path through the bleed port and the bleed air passageway is fluidly connected to the plenum through the outlet.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION

The following descriptions should not be considered limiting in any way. With reference to the accompanying drawings, like elements are numbered alike:

The detailed description explains embodiments of the present disclosure, together with advantages and features, by way of example with reference to the drawings.

DETAILED DESCRIPTION

A detailed description of one or more embodiments of the disclosed apparatus and method are presented herein by way of exemplification and not limitation with reference to the Figures.

Figure 1:
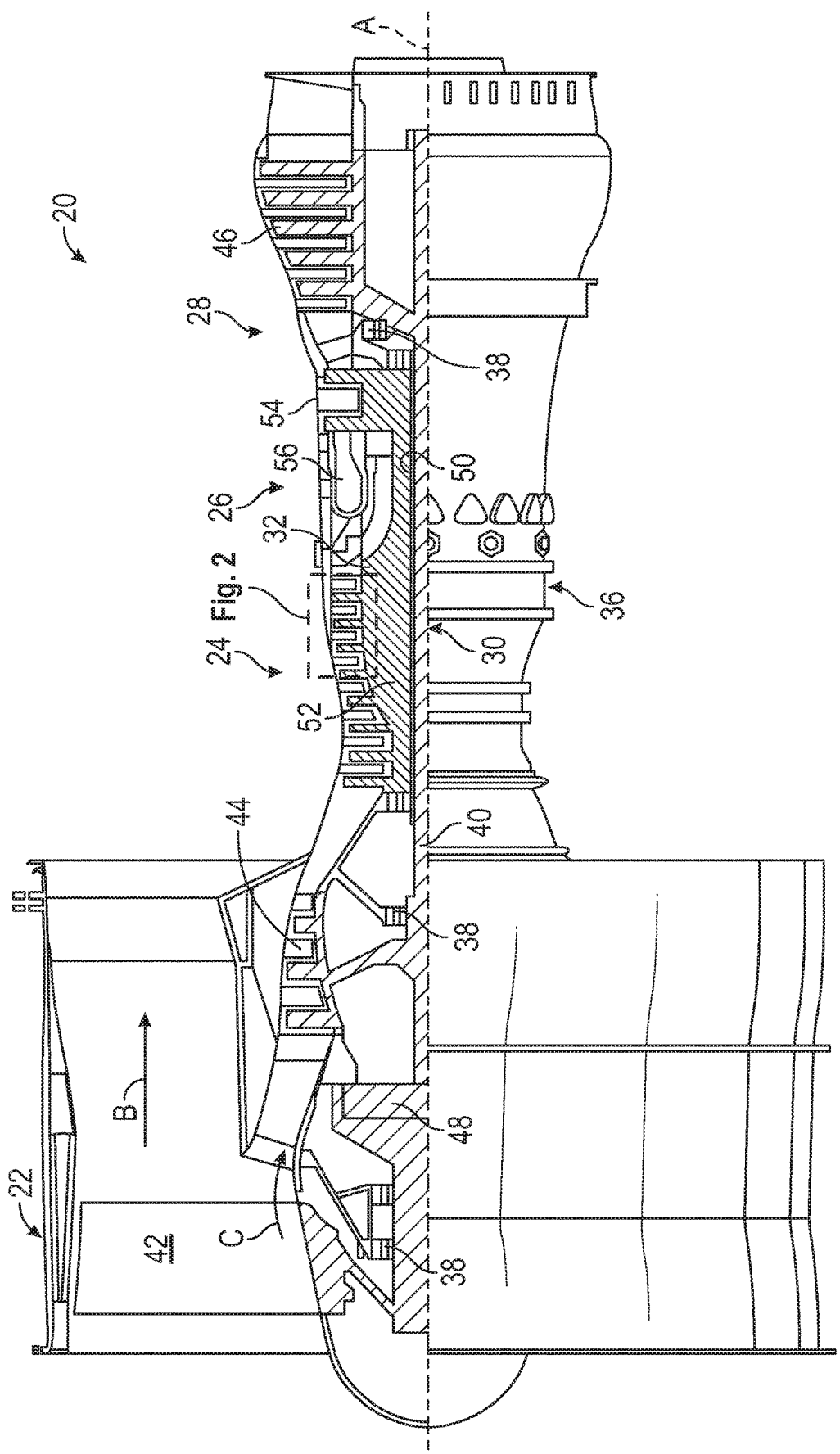
FIG. 1 is a partial cross-sectional illustration of a gas turbine engine that may incorporate embodiment of the disclosure.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,688 meters). The flight condition of 0.8 Mach and 35,000 ft (10,688 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(518.7°\ R)]^{0.5}$. The "Low corrected fan tip speed" as disclosed herein according to one non-limiting embodiment is less than about 1150 ft/second (350.5 m/sec).

Figure 2:
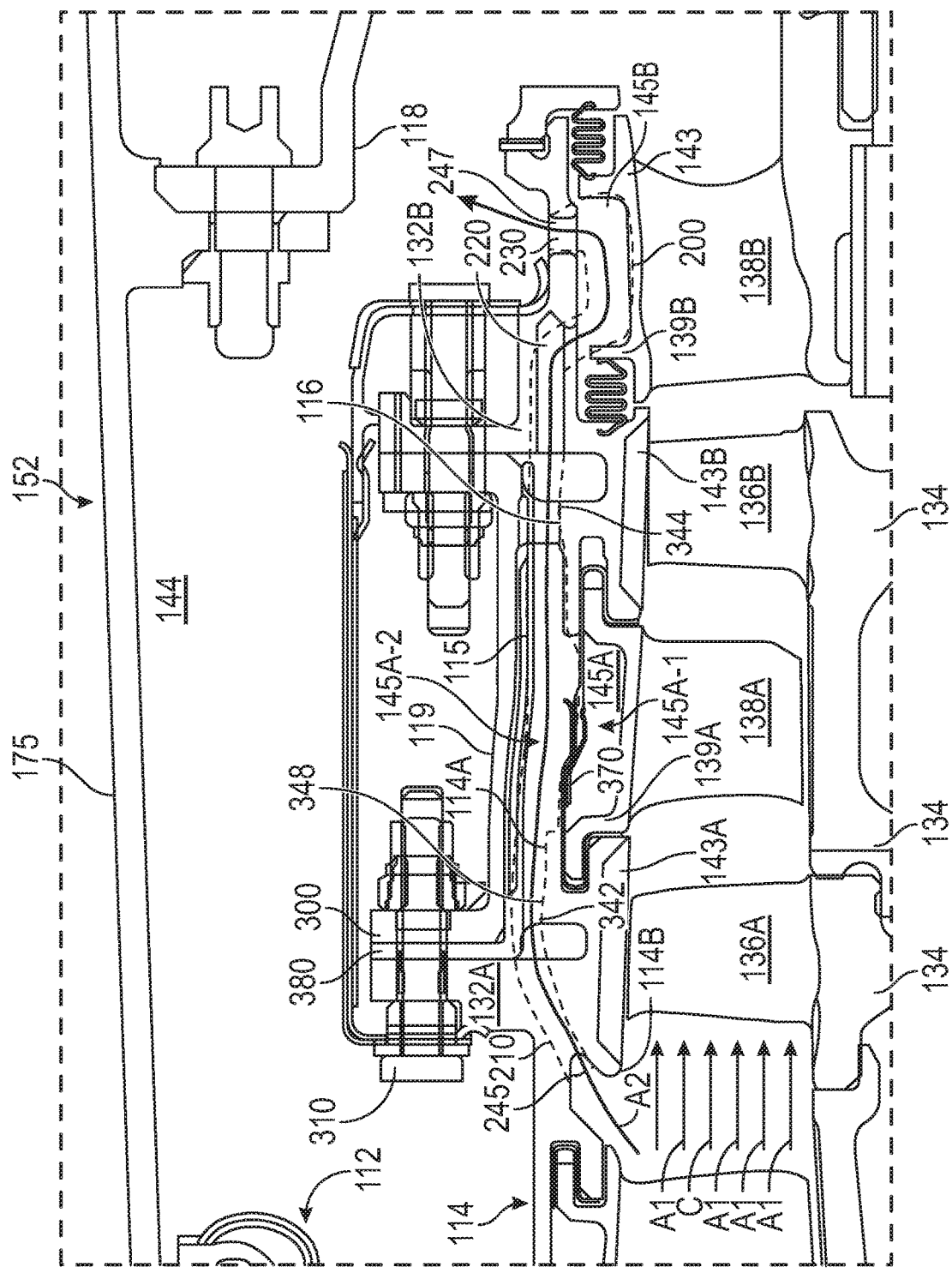
FIG. 2 is a side cross-sectional illustration of a high pressure compressor section of the gas turbine engine of FIG. 1.

Referring now to FIG. 2, with continued reference to FIG. 1, a cross-section of high pressure compressor section 152 of the gas turbine engine 20 of FIG. 1 is illustrated, in accordance with an embodiment of the present disclosure. The high pressure compressor section 152 includes an outer case 112 and an inner case 114 circumscribing the high pressure speed spool 32 (see FIG. 1). In an embodiment, the outer case 112 may be a split case. The inner case 114 includes a plurality of seal section 132A-132B. The high pressure compressor section 152 includes rotors 134, blades 136A-136B, and vanes 138A-138B.

The outer case 112, inner case 114, high pressure speed spool 32, and the rest of the gas turbine engine 20 surround the engine central longitudinal axis A (see FIG. 1). The inner case 114 is coupled to outer case 112.

The seal sections 132A-132B include seals 143A-143B for sealing against blades 136A-136B, and vane slots 145A-145B for receiving outer diameter ends 139A-139B of the vanes 138A-138B. The first seal section 132A includes a first seal 143A that adjoins a first blade 136A. The first seal section 132A includes a first vane slot 145A configured to receive an outer diameter end 139A of the first vane 138A. The first vane 138A being secured to the first vane slot 145A through the outer diameter end 139A of the first vane 138A. The second seal section 132B includes a second seal 143B that adjoins a second blade 136B. The second seal section 132B includes a second vane slot 145B configured to receive an outer diameter end 139B the second vane 138B. The second vane 138B being secured to the second vane slot 145B through the outer diameter end 139B of the second vane 138B. The first seal section 132A and the second seal section 132B may be bolted to each other to form a rigid annular structure that is spaced radially inward of outer case 112 to form a plenum 144.

The blades 136A-136B extend radially outward from rotors 134. Rotors 134 are axially connected to each other and high pressure speed spool 32, via any suitable coupling as is known in the art, to define an inner diameter flow path boundary. The rotors 134 includes various seals, such as knife edge, labyrinth or abradable seals, to seal against inner diameter ends of vanes 138A-138B. The vanes 138A-138B extend radially inward from the outer case 112 and the inner case 114 so as to be interposed with the blades 136A-136B. The outer case 112 and the inner case 114 are axially connected to each other to define an outer diameter flow path boundary 175. The inner case 114 include seals 143A-143B to seal against outer diameter ends of blades 136A-136B. In the disclosed embodiment, seals 143A-143B comprise abradable seals.

As shown in FIG. 2, the inner cases 114 is attached to a first mounting flange 380 and a second mounting flange 300 through one or more bolts 310. The first mounting flange 380 includes an integral heat shield 115 and a first interrupted snap 342. The second mounting flange 300 secures the inner case 119. The inner case 119 includes a second interrupted snap 344 The first interrupted snap abuts an outer surface 348 of the second mounting flange 300 and the second interrupted snap 344 abuts an outer surface 116 located on the inner housing 119. The first interrupted snap 342 is located approximately radially outward from the first blade 136A and the second interrupted snap 344 is located approximately radially outward from the second blade 136B.

The rotation of the rotors 134, along with other rotors not shown in FIG. 2, forces inlet air A1 through the core flow path C within the high pressure compressors section 152 formed by the outer case 112 and the inner case 114. Inlet air A1 through the core airflow path C is compressed as it passes through blades 136A-136B and vanes 138A-138B. The second vane 138B is an outlet guide vane for the compressor for diffusing compressed air and directing inlet air A1 into the combustor 56 (see FIG. 1).

The inner case 114 includes a bleed port 245, which permits a portion of the compressed inlet air A1 to be siphoned from the core flow path C. The bleed port 245 is located on an inner surface 114B of the inner case 114. The inner surface 114A is proximate the core airflow path C, as shown in FIG. 2. The siphoned compressed inlet air A2 (i.e., bleed air) is directed through a bleed air passageway 200 at least partially within the inner case 114 and is expelled through an outlet 247 into the plenum 144. The outlet 247 is located on an outer surface 114B of the inner case 114. The outer surface 114B is proximate the plenum 144, as shown in FIG. 2. The bleed air passage 200 passes through the inner case 114 to fluidly connect the bleed port 245 to the outlet 247. The bleed air passageway 200 is fluidly connected to the core flow path C through the bleed port 245 and the bleed air passageway 200 is fluidly connected to the plenum 144 through the outlet 247.

The bleed air passageway 200 may comprise a first fluid passageway 210, a second fluid passageway 220, and a third fluid passageway 230. The first fluid passageway 210 is located within the inner case 114, the second fluid passageway 220 is located within the inner case 114, and the third fluid passageway 230 is located within the inner case 114. The bleed air passageway 200 passes through the first interrupted snap 342 and the second interrupted snap 344. The first fluid passageway 210 fluidly connects the core airflow path C to the first interrupted snap 342. The first fluid passageway 210 fluidly connecting the bleed port 245 to the first interrupted snap 342. The first interrupted snap 342 fluidly connects the first fluid passageway 210 to first vane slot 145A for receiving the outer diameter end 139A of the first vane 138A. In other words, the first vane slot 145A is fluidly connected to the first fluid passageway 210 through the first interrupted snap 342. As discussed further below, a seal 370 may wrapped around the outer diameter end 139A of the first vane 138A and the seal may segment the first vane slot into a radially inward section 145A-1 and a radially outward section 145A-2. The radially outward section 145A-2 is part of the bleed air passageway 200 while the radially inward section 145A-1 is sealed from the radially outward section 145A-2 by the seal 370. The first vane slot 145A fluidly connects the first interrupted snap 342 to the second interrupted snap 344. The second interrupted snap 344 fluidly connects the first vane slot 145A to the second fluid passageway 220. The second fluid passageway 220 may be fluidly connected to the second vane slot 145B for receiving the outer diameter end 139B of the second vane 138B. The second fluid passageway 220 may be fluidly connected to the outlet 247. The second fluid passageway 220 may be fluidly connected to the outlet 247 through the second vane slot 145B. The third fluid passageway 230 fluidly connects the second vane slot 145B to the plenum 144 through the outlet 247.

Advantageously, the bleed air passageways 200 can utilize siphoned compressed inlet air A2 as a heat exchanger to absorb heat from the inner cases 114 and the absorb heat the outer diameter ends 139A-139B of the vanes 138A-138B.

In an embodiment, a seal 370 is wrapped around the outer diameter end 139A of the first vane 138A. The seal 370 is configured to reduce and/or eliminate hot compressed inlet air A1 from leaking around the outer diameter end 139A and mixing with the siphoned compressed inlet air A2 within the bleed air passageway 200. Thus, the seal 370 is configured to fluidly separate the bleed air passageway 200 from the core flow path C within the first vane slot 145A. In an embodiment, the seal 370 is a metal seal. Additionally, a heat shield 115 may be located radially inward from the first mounting flange 380 to reduce heat transfer to the inner case 114. The heat shield 115 is interposed between the first mounting flange 380 and the bleed air passageway 200.

The siphoned compressed inlet air A2 is distributed through the bleed air passageway 200 produced by rotation of upstream blades. From plenum 144, siphoned compressed inlet air A2 can be passed through various bosses in outer case 112 for routing to various systems of the gas turbine engine or other external systems. For example, relatively cooler siphoned compressed inlet air A2 can be routed to various components in the hot section of the gas turbine engine (e.g. combustor or turbine) to provide cooling. Similarly, siphoned compressed inlet air A2 can be routed to an environmental control system interconnected with gas turbine engine 20.

Figure 3:
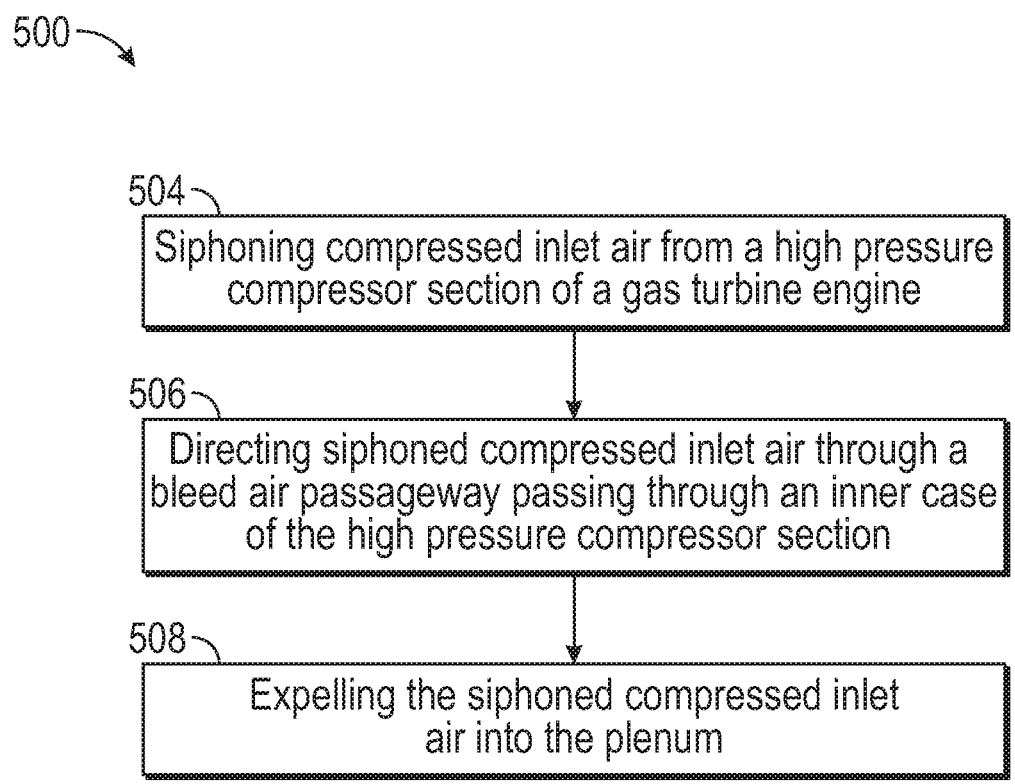
FIG. 3 is a flow chart of a method of cooling a high pressure compressor section of a gas turbine engine, in accordance with an embodiment of the disclosure.

Referring now to FIG. 3, with continued reference to FIGS. 1-2, a method 500 of cooling a high pressure compressor section 152 of a gas turbine engine 20 is illustrated, in accordance with an embodiment of the present disclosure. At block 504, compressed inlet air A1 is siphoned from a high pressure compressor section 152 of a gas turbine engine 20. At block 506, the siphoned compressed inlet air A2 is directed through a bleed air passageway 200 passing through an inner case 114 of the high pressure compressor section 152. As mentioned above, the inner case 114 separates a core flow path C of the gas turbine engine and a plenum 144 formed between the inner case 114 and an outer case 112. At block 508, the siphoned compressed inlet air A2 is expelled into the plenum 144. The method 500 may further comprise prior to expelling the siphoned compressed inlet air A2 into the plenum 144 at block 508 that the siphoned compressed inlet air A2 is directed through at least one of a first vane slot 145 and a second vane slot 145B.

While the above description has described the flow process of FIG. 3 in a particular order, it should be appreciated that unless otherwise specifically required in the attached claims that the ordering of the steps may be varied.

Technical effects of embodiments of cooling an inner case of high pressure compressor section by siphoning compressed inlet air from a core flow path within the high pressure compressor section and directing the siphoned compress inlet air through the a bleed air passageway passing through the inner case.

The term "about" is intended to include the degree of error associated with measurement of the particular quantity based upon the equipment available at the time of filing the application. For example, "about" can include a non-limiting range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A high pressure compressor section of a gas turbine engine, the high pressure compressor section comprising:
    an inner case separating a core flow path of the gas turbine engine and a plenum formed between the inner case and an outer case;
    a bleed port located on an inner surface of the inner case, the inner surface being proximate the core flow path;
    an outlet located on an outer surface of the inner case, the outer surface being proximate the plenum; and
    a bleed air passageway passing through the inner case to fluidly connect the bleed port to the outlet, wherein the bleed air passageway is fluidly connected to the core flow path through the bleed port and the bleed air passageway is fluidly connected to the plenum through the outlet;
    wherein the bleed air passageway passes radially outward of a first vane and a second vane.

2. The high pressure compressor section of claim 1, wherein the outlet is located radially outward of the second vane.

3. The high pressure compressor section of claim 1, wherein an outer diameter end of the first vane is located within a first vane slot within the inner case, the first vane being secured to the first vane slot through the outer diameter end of the first vane, wherein the bleed air passageway further comprises the first vane slot.

4. The high pressure compressor section of claim 1, wherein an outer diameter end of the second vane is located within a second vane slot within the inner case, the second vane being secured to the second vane slot through the outer diameter end of the second vane, wherein the bleed air passageway further comprises the second vane slot.

5. The high pressure compressor section of claim 3, further comprising:
a seal wrapped around the outer diameter end of the first vane within the first vane slot, the seal being configured to fluidly separate the bleed air passageway from the core flow path within the first vane slot.

6. The high pressure compressor section of claim 1, further comprising:
a first mounting flange including a first interrupted snap;
a second mounting flange secures to the inner case, the inner case including a second interrupted snap, wherein the bleed air passage passes through the first interrupted snap and the second interrupted snap.

7. The high pressure compressor section of claim 6, further comprising:
a first fluid passageway within the inner case, the first fluid passageway fluidly connecting the bleed port to the first interrupted snap.

8. The high pressure compressor section of claim 7, further comprising:
a first vane slot configured to receive an outer diameter end of a first vane, wherein the first vane slot is fluidly connected to the first fluid passageway through the first interrupted snap.

9. The high pressure compressor section of claim 8, further comprising:
a second fluid passageway within the inner case, the second fluid passageway being fluidly connected to the second vane slot through the second interrupted snap.

10. The high pressure compressor section of claim 9, wherein the second fluid passageway is fluidly connected to the outlet.

11. The high pressure compressor section of claim 10, further comprising:
a second vane slot configured to receive an outer diameter end of a second vane, wherein the second fluid passageway is fluidly connected to the outlet through the second vane slot.

12. The high pressure compressor section of claim 11, wherein the second vane slot is fluidly connected to the outlet through a third fluid passage within the inner case.

13. The high pressure compressor section of claim 1, wherein the bleed air passageway further comprises:
a second vane slot configured to receive an outer diameter end of a second vane.

14. The high pressure compressor section of claim 1, wherein the bleed air passageway further comprises:
a first fluid passageway within the inner case, the first fluid passageway being fluidly connected to the bleed port;
a first vane slot configured to receive an outer diameter end of a first vane, the first vane slot being fluidly connected to the first fluid passageway;
a second fluid passageway within the inner case, the second fluid passageway fluidly connected the first vane slot;
a second vane slot configured to receive an outer diameter end of a second vane, the second vane slot being fluidly connected to the second fluid passageway; and
a third fluid passageway within the inner case, the third fluid passageway fluidly connecting the second vane slot to the outlet.

15. The high pressure compressor section of claim 14, further comprising:
a first mounting flange including a first interrupted snap;
a second mounting flange secures to the inner case, the inner case including a second interrupted snap, wherein the first vane slot is fluidly connected to the first fluid passageway through the first interrupted snap, and wherein the second vane slot is fluidly connected to the second fluid passageway through the second interrupted snap.

16. The high pressure compressor section of claim 15, wherein the second vane is an exit guide vane for directing compressed inlet air from the core flow path into a combustor of the gas turbine engine.

17. The high pressure compressor section of claim 15, further comprising:
a heat shield interposed between the first mounting flange and the bleed air passageway.

18. A method of cooling a high pressure compressor section of a gas turbine engine, the method comprising
siphoning compressed inlet air from a high pressure compressor section of a gas turbine engine;
directing siphoned compressed inlet air through a bleed air passageway passing through an inner case of the high pressure compressor section, the inner case separating a core flow path of the gas turbine engine and a plenum formed between the inner case and an outer case; and
expelling the siphoned compressed inlet air into the plenum,
wherein the bleed air passageway passes radially outward of a first vane and a second vane.

19. A gas turbine engine, comprising:
a high pressure compressor section comprising:
an inner case separating a core flow path of the gas turbine engine and a plenum formed between the inner case and an outer case;
a bleed port located on an inner surface of the inner case, the inner surface being proximate the core flow path;
an outlet located on an outer surface of the inner case, the outer surface being proximate the plenum; and
a bleed air passageway passing through the inner case to fluidly connect the bleed port to the outlet, wherein the bleed air passageway is fluidly connected to the core flow path through the bleed port and the bleed air passageway is fluidly connected to the plenum through the outlet,
wherein the bleed air passageway passes radially outward of a first vane and a second vane.

* * * * *